United States Patent [19]
Halperin

[11] 3,974,800
[45] Aug. 17, 1976

[54] RESTRAINING DEVICE FOR DOGS AND OTHER ANIMALS

[76] Inventor: Abraham Halperin, 102-36 64th Ave., Forest Hills, N.Y. 11375

[22] Filed: Jan. 20, 1975

[21] Appl. No.: 542,501

[52] U.S. Cl............................. 119/106; 119/109
[51] Int. Cl.²......................................... A01K 27/00
[58] Field of Search..................... 119/116, 109, 96; 54/71

[56] References Cited
UNITED STATES PATENTS 2,826,172   3/1958   Buckle et al.................... 119/109 X
3,311,088   3/1967   Peterlin............................. 119/109

*Primary Examiner*—J.N. Eskovitz
*Attorney, Agent, or Firm*—Karl F. Ross; Herbert Dubno

[57] ABSTRACT

A strap, fastenable to an animal's neck near its body, and a flexible leash extension, looped into a choke collar, are interconnected by an array of contracted coil springs holding them apart whereby the choke collar is maintained close to the animal's jaws. The leash extension is preferably a chain having some of its links engaged by hooked extremities of the coil springs.

6 Claims, 2 Drawing Figures

RESTRAINING DEVICE FOR DOGS AND OTHER ANIMALS

Field of the Invention

My present invention relates to a restraining device for an animal, such as a dog, of the class commonly referred to as dog collars and designed to be attached to a leash to be held by the master or trainer.

BACKGROUND OF THE INVENTION

It is known, for the handling of large or particularly vicious dogs, to use a restraining device in the form of a choke collar wherein a flexible extension of a leash passes through a ring or eye on its free end so as to constitute a tightenable loop engaging the animal's neck. As the animal pulls against the leash, the loop contracts and causes a certain discomfort which will induce the animal to follow the lead of the master.

Such choke collars, however, are not free from drawbacks. On the one hand, their effectiveness is greatest in the area of a dog's neck close to its jaws and diminishes if the collar slips toward the shoulder as it might in the case of a forward-pulling animal. On the other hand, when the leash is allowed to slacken, the collar (unless provided with suitable stop means) may become so loose that the animal may work its head free of the loop, possibly before the master notices that something is amiss.

OBJECTS OF THE INVENTION

The general object of my present invention, therefore, is to provide an improved restraining device for dogs and other animals obviating these drawbacks.

A more particular object is to provide an effective device for the training of large dogs or other animals of comparable strength.

SUMMARY OF THE INVENTION

I realize these objects, in accordance with my present invention, by the combination of a flexible strap, fastenable about an animal's neck near its body, with a flexible leash extension secured to the strap through the intermediary of spacing means maintaining a predetermined distance therebetween which substantially corresponds to the length of the animal's neck, the leash extension forming a tightenable loop in the manner of a conventional choke collar about the neck in the vicinity of the jaws while the strap is fitted to the neck close to the shoulders.

Advantageously, pursuant to another feature of my invention, the spacing means holding the strap and the loop apart are a plurality of transversely separated resilient bracing elements such as contracted coil springs. This allows the animal virtually full freedom in turning its head and also lets it freely perspire at higher temperatures. Where the leash extension is a chain, the coil springs may have terminal hooks engaging certain links of the chain.

I have further found that it is not necessary to distribute these bracing elements around the entire periphery of the collar; instead, they may be confined to an imaginary semicylinder coming to lie at the front of the animal's neck while the choke ring and preferably also the strap buckle are disposed on the opposite side.

BRIEF DESCRIPTION OF THE DRAWING

The above and other features of my invention will now be described in detail with reference to the accompanying drawing in which.

SPECIFIC DESCRIPTION

Figure 1:
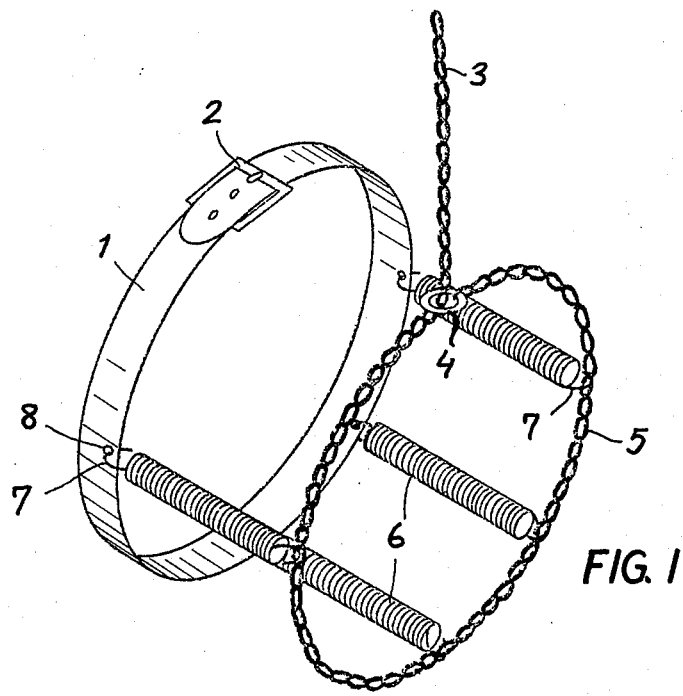
FIG. 1 is a perspective view of a restraining device embodying my invention.
Figure 2:
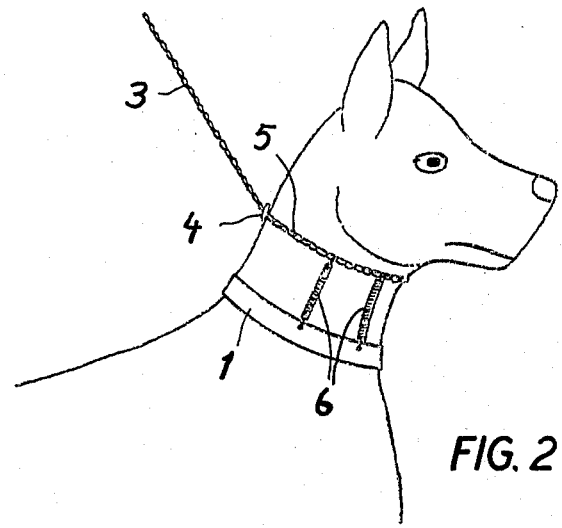
FIG. 2 shows the device of FIG. 1, drawn to a smaller scale, mounted on the neck of a dog.

The restraining device shown in the drawing comprises an adjustable strap 1 of leather or the like provided with a buckle 2 enabling it to be placed in position around the neck of a dog in proximity to its shoulders, as seen in FIG. 2. A chain 3, integral with or attached to a leash not further illustrated, is provided at its free end with a ring 4 through which another part of that chain is pulled to form a loop 5 which, in the manner of a choke collar, tightens upon the exertion of pull on the opposite chain end. The loop 5 and the strap 1 are substantially coaxial, in the illustrated working position, and are held spaced apart by several (here four) bracing elements 6 in the shape of contracted coil springs with closely adjoining turns, the end turns being formed into hooks 7 which engage in holes 8 of strap 1 and in links of chain 3. Springs 6 are approximately equispaced, in the peripheral direction, and in their undeformed position extend along generatrices of an imaginary semicylinder on the side of the device opposite that carrying the buckle 2 and the ring 4; as shown in FIG. 2, the springs 6 come to lie against the front of the animal's neck and maintain the loop 5 close to the jaws since the strap 1 cannot move farther away from the head.

The exact position of ring 4 is not critical but is preferably approximately in line with buckle 2 so that both should provide about the same degree of adjustability to animals of different sizes. In a device designed for a specific neck size it is possible to place the ring 4 in such a position that the nearest spring 6, unable to enter the ring, acts as a stop preventing any excessive choking of the animal.

I claim:

1. A restraining device for an animal, comprising:
    a flexible strap fastenable around an animal's neck near its body;
    spacing means including a plurality of transversely separated resilient bracing elements secured to said strap;
    a flexible leash extension anchored to said spacing means at a predetermined distance from said strap substantially corresponding to the length of the animal's neck whereby said leash extension comes to lie close to the animal's jaws upon a fitting of the strap to its neck; and
    an eye fastened to a free end of said leash extension on one side of said spacing means and traversed by another part of said leash extension on the opposite side of said spacing means whereby said leash extension forms a tightenable loop about the animal's neck in the vicinity of the jaws.

2. A restraining device as defined in claim 1 wherein said bracing elements are contracted coil springs.

3. A restraining device as defined in claim 1 wherein said leash extension is a chain, said bracing elements being anchored to certain links of said chain.

4. A restraining device as defined in claim 1 wherein said bracing elements extend substantially along generatrices of an imaginary semicylinder.

5. A restraining device as defined in claim 4 wherein said bracing elements are secured to portions of said strap and said leash extension coming to lie at the front of the animal's neck upon a positioning of said eye at the back of the neck, the remainder of said strap and said leash extension being free from said bracing elements.

6. A restraining device as defined in claim 5 wherein said strap is provided with a buckle substantially in line with said eye upon a fitting thereof to the animal's neck.

* * * * *